Aug. 8, 1950 W. A. WALDHERR 2,517,814
SAW BLADE MOUNTING
Filed Feb. 13, 1946

Inventor
William A. Waldherr
By Thiess, Olson & Mecklenburger
Attys

Patented Aug. 8, 1950

2,517,814

UNITED STATES PATENT OFFICE 2,517,814

SAW BLADE MOUNTING

William A. Waldherr, Chicago, Ill., assignor to General Steel Warehouse Co., Inc., Chicago, Ill., a corporation of Illinois Application February 13, 1946, Serial No. 647,241

5 Claims. (Cl. 145—33)

This invention relates to bucksaws of the U or bow frame type in which the saw blade extends between the ends of the frame.

In the usual construction, links or other devices connect the ends of the blade with the saw frame and a toggle type lever device is interposed at one end to tighten the blade in place in the frame or to loosen it for removal.

Objects of the present invention are to provide a construction in which all such linkage and toggle mechanism are eliminated, in which the ends of the saw blade are widely gripped by the frame safely and firmly to hold the blade in its proper plane of operation, in which the normal separation of the frame ends is greater than the length of the saw blade and the spring nature of the frame permits them to be forced toward each other to enable the blade to be connected therewith and thereafter when released to lock the same together and to hold the blade under heavy tension in the frame, the blade being removable by the reverse operation, in which, due to the elimination of linkages, etc., the cutting or sawing edge of the blade extends closer to the frame ends and thus utilizes substantially the entire space between the frame ends for such cutting edge, in which an improved pivot or pin construction at the ends permits ready connection or disconnection of the saw blade and frame ends when the latter are forced together and securely locks and clamps the same together by the tension of the frame on the blade when the said frame ends are released, and in which a bucksaw is produced which is especially efficient and suitable for all-around work in the house, garden, farm, warehouse, in fishing, hunting and scout camps, in pruning and in other situations.

In the accompanying drawing, in which one embodiment of the invention is shown,

Figure 3:
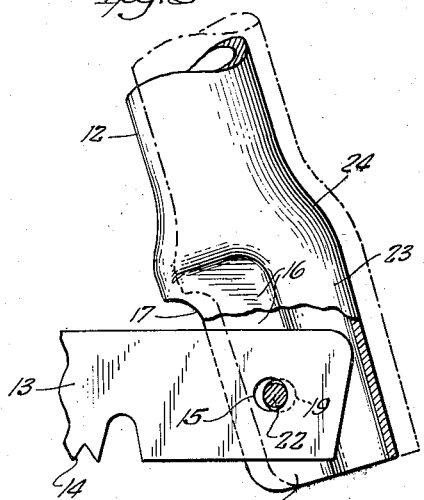
Figure 4:
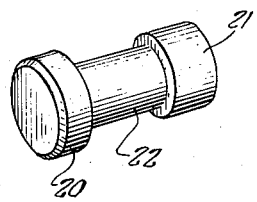

Fig. 3, also at approximately full scale, is a side view of such connection, the one side of the frame end being broken away to show the pivotal joint; and Fig. 4 is a perspective view of the pivot pin, on an enlarged scale.

Referring to these figures, the bucksaw, generally designated 10, comprises the U or bow frame having the longitudinal portion 11 and the transverse end portions 12, and the saw blade 13 extending between and secured to the ends of the frame.

The frame preferably consists of a single piece of high quality steel tubing with the transverse ends formed on an expanding taper affording a convenient handhold in the use of the saw. Such bucksaws are comparatively large devices, the blades alone ranging from two to four feet in length in the different sizes and the ends of the frames being deep enough to be grasped by both hands of the user. In such saws, the blades must be held in strong tension for various reasons, including the prevention of buckling in the use of the saw under the strenuous and husky two-hand operation to which it may be subjected. Thus, in the bucksaw here disclosed, when assembled, the frame is adapted preferably to place the blade under a tension as high as around 500 pounds.

This high tension is provided in this instance by the form and resiliency and springiness of the frame itself, the tapering ends 12 thereof being so formed with relation to the longitudinal part 11 as normally, that is, before assembly or whenever the frame and blade are not assembled, to stand or be spaced further apart than when assembled with the blade. This, in a way, is indicated by the dotted-line position of the end in Fig. 3, though the extent of the outward movement or the normal position thereof is not intended to be so indicated, as it may vary considerably from that shown. Then by means of a suitable jig or other apparatus the said ends are forced together or toward each other sufficiently to be connected with the ends of the blade, as hereinafter explained. When the blade is so connected and the ends of the frame are released, they tend to spring back toward normal position and thereby put the blade under the desired high spring tension, which effectually prevents buckling or other troubles due to lack of a sufficient pull on the ends of the blade.

Figure 1:
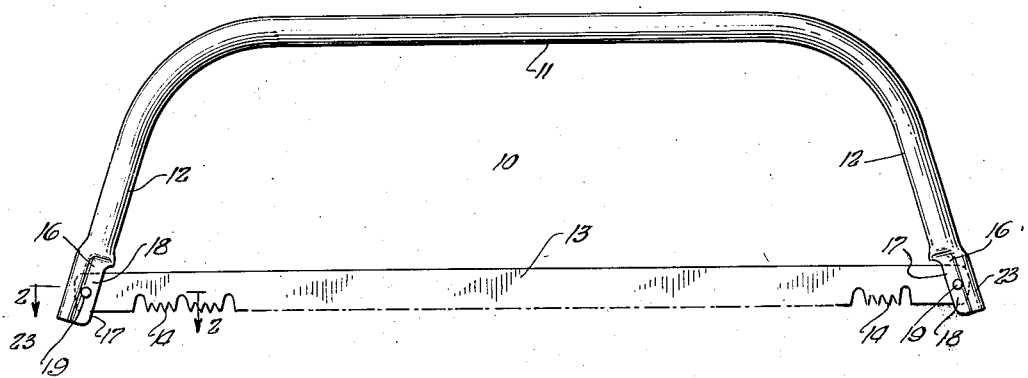
Fig. 1 is a side view of the complete bucksaw.
Figure 2:
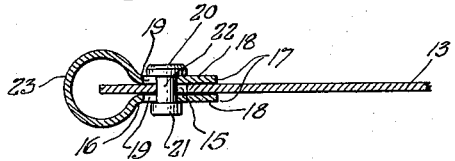
Fig. 2 is a section on the line 2—2 of Fig. 1 showing at approximately full scale the connection of the saw blade with the frame at one end.

The blade 13 itself is preferably made of the best quality of steel for the purpose, which is especially hardened, treated and tempered and provided with suitable teeth 14 along its outer edge and is suitably apertured, as at 15 (Figs. 2 and 3), at each end. The blade for satisfactory operation and long life should be firmly held flatwise in the axial plane of the frame without twisting or distortion or danger of loosening at its ends when in use or at other undesired times, and in a way to withstand the enormous tension placed upon it by the frame and without developing lateral or improper strains and stresses therein tending to crack or break the same or otherwise shorten its period of useful life.

This is accomplished in the present instance by partially flattening the ends of the arms 12 of the frame in the axial plane of the frame, as indicated at 16, and trimming off the inside edge of the same, as at 17, to produce the flat clamping jaws 18 which are adapted to receive the apertured ends of the saw blade 13 and flatly to grip and hold them in the full width of the blade in the axial plane of the frame, whereby no twisting of the blade can occur and no lateral stresses or strains therein be developed.

These clamping jaws are apertured, as at 19, preferably with circular holes of the size and form of those, 15, in the ends of the saw blade, and a suitable metal pivot pin is placed therethrough to connect the ends of the blade to the ends of the frame. Keyhole slots may be used, but an advantage of the circular holes is that less relative movement of blade and frame ends is required for locking.

This pivot and clamping pin, Fig. 4, is preferably double-headed, the larger head 20 being greater in diameter than the apertures 19 through the jaws 18 so as to overlap the edges of the same when the pin is inserted therein. The smaller head 21 is smaller in diameter than the holes 19 in the jaws and the holes 15 in the ends of the saw, so as to pass therethrough when the holes are brought into alignment. The body 22 of the pin is less in diameter than the head 21 and long enough to pass through the jaws and blade together and so that when inserted the inside faces or ledges of the heads will nicely and snugly fit the outside faces of the jaws adjacent the apertures.

With this arrangement, when the ends of the frame are compressed toward each other so that the blade can be inserted in the jaws in apertured alignment, the pin can be inserted therethrough—smaller end 21 first—as far as the larger head 20 will permit. Then when the pressure on the frame is released, the jaws 18 will draw back and the pins and apertures will be drawn relatively into the positions indicated in Figs. 2 and 3, where the body 22 of the pin is tightly gripped by the inner edges of the jaw apertures and the outer edges of the saw apertures, thus holding the blade in tension in the jaws and frame, and the heads of the pin will draw over the inner edges of the jaw apertures and hold the jaws in clamping relation on the blade and the pins and all locked in position and together. The blade may be readily removed from the frame by the reverse operation, that is, by compressing the ends of the frame until the apertures in one or both ends align and then pressing the pin or pins out through them.

In the flattening of the ends of the saw frame, as at 16, the outer portion of the tube alongside the flattened portion is preferably formed in smaller tubular form, as at 23, and is slightly bulged out, as at 24, beyond the line of the frame end when viewed from the side. Such form gives lateral stability to the flattened ends and affords free room inside for the end of the saw so that no undue lateral strains are set up therein in the final assembled form, the clamping jaws 18 engaging the saw for the full width thereof in a relatively narrow zone above and below the pivot pin, whereby, while the saw is maintained thereby in the axial plane of the frame, the high tension on the saw is borne by the pivot pin 22 without interference, distortion or harmful effects by the presence or action of the jaws.

From the foregoing it will be seen that the invention accomplishes the various objects and has many advantages. All linkages and toggle mechanism are eliminated; there are only the frame, blade and pins to it; the ends of the blade are held in the proper plane of operation; the blade may be held in high tension; there is no lost space at the ends for the sawing edge of the blade; the mechanism is simple, and economy of labor, material and cost is apparent.

Without further elaboration, the foregoing will so fully explain the gist of this invention that others may, by applying current knowledge, readily adapt the same for use under varying conditions of service, without eliminating certain features which may properly be said to constitute the essential items of novelty involved, which items are intended to be defined and secured by the following claims.

I claim:

1. A locking device for a saw of the type having a U-shaped spring frame and a bifurcated terminus on at least one of the legs thereof, the saw blade being positioned in tension between the legs and the said furcations and the end of the blade and the furcations having closed apertures adapted to be aligned, comprising a pin having a head and a shank extending from said head and both adapted to be passed through the said aligned apertures, said shank being smaller than said head in its smallest diameter, whereby the head overlaps the furcation when the blade is drawn longitudinally into tension between the said legs.

2. A locking device for a saw of the type having a U-shaped spring frame and a bifurcated terminus on at least one of the legs thereof, the saw blade being positioned in tension between the legs and the said furcations and the end of the blade and the furcations having circular closed apertures adapted to be aligned, comprising a pin having a circular head and a shank extending from said head and both adapted to be passed through the said aligned apertures, said shank being smaller in diameter than said head, whereby the head overlaps the furcation when the blade is drawn longitudinally into tension between the said legs, and another head on the opposite end of the shank from the said first-named head and of a size to overlie the adjacent furcation when the blade is tensioned between the said legs.

3. A locking device for a saw of the type having a U-shaped spring frame and a bifurcated terminus on at least one of the legs thereof, the saw blade being positioned in tension between the legs and the said furcations and the end of the blade and the furcations having closed circular apertures adapted to be aligned, comprising a pin having a head and a shank extending from said head and both adapted to be passed through the said aligned apertures, said shank being smaller in diameter than the smallest diameter of said head, whereby the head overlaps the furcation when the blade is drawn longitudinally into tension between the said legs, and another head on the opposite end of the shank larger than said apertures and engaging the adjacent furcation.

4. A saw comprising a bow frame of spring material and a saw blade held in tension between the ends of said frame, the blade-holding means at at least one end of the frame including flattened jaws to receive the flat end of the saw blade between them, said jaws and the saw end having circular apertures transversely therethrough adapted to be brought into alignment by compressing the ends of the bow frame toward each other, and a double-headed pin extending through said apertures, the head on one end of the pin being circular and of a size to fit but freely pass through said apertures, the head on the other end of the pin being larger than the apertures and acting as a stop against the jaw when inserting the pin through the aligned apertures, the body of the pin being less in diameter than the said smaller head and long enough to extend through said jaws and blade whereby when the pin is inserted in any radial position in the aligned apertures and the pressure on the frame released the heads of the pin are drawn into overlapping engagement with the jaws adjacent the said apertures to hold the jaws, blade and pin solidly together.

5. A saw comprising a bow frame of spring material and a saw blade held in tension between the ends of said frame, the blade-holding means at one end of the frame including flattened jaws to receive the flat end of the saw blade between them, said jaws and the saw end having apertures transversely therethrough adapted to be brought into alignment by compressing the ends of the bow frame toward each other, and a double-headed pin extending through said apertures, the head on one end of the pin being smaller and of a size to fit but freely pass through said apertures, the head on the other end of the pin being larger than the apertures and acting as a stop against the jaw when inserting the pin through the aligned apertures, the body of the pin being less in diameter than the said smaller head and long enough to extend through said jaws and blade, the said smaller head slidingly overlapping the adjacent outer face of the jaw when the pin is inserted in the aligned apertures and the frame released, thereby putting the blade in tension in the frame and causing the said pin head to so overlap and hold the jaws and blade solidly together during the use of the saw.

WILLIAM A. WALDHERR.

REFERENCES CITED

The following references are of record in the file of this patent:

UNITED STATES PATENTS

| Number | Name | Date |
|---|---|---|
| 103,700 | Andrews | May 31, 1870 |
| 2,303,705 | Perrson | Dec. 1, 1942 |

FOREIGN PATENTS

| Number | Country | Date |
|---|---|---|
| 14,744 | Great Britain | Nov. 8, 1884 |
| 27,339 | Great Britain | Nov. 24, 1909 |
| 358,059 | Germany | Sept. 6, 1922 |
| 584,073 | Germany | Apr. 6, 1933 |
| 834,984 | France | Sept. 12, 1938 |